United States Patent [19]
Fleming

[11] Patent Number: 5,845,093
[45] Date of Patent: Dec. 1, 1998

[54] MULTI-PORT DIGITAL SIGNAL PROCESSOR

[75] Inventor: Michael E. Fleming, Vancouver, Wash.

[73] Assignees: Sharp Microelectronics Technology, Inc., Camas, Wash.; Sharp Kabushiki Kaisha, Osaka, Japan

[21] Appl. No.: 877,317

[22] Filed: May 1, 1992

[51] Int. Cl.[6] .................................................. G06F 17/14
[52] U.S. Cl. ................................ 364/726.07; 364/726.06
[58] Field of Search .................................. 395/275, 800; 364/726, 726.07, 726.06; 370/210

[56] References Cited

U.S. PATENT DOCUMENTS

| | | | |
|---|---|---|---|
| 3,721,812 | 3/1973 | Schmidt | 364/726.02 |
| 4,689,762 | 8/1987 | Thibodeau | 364/726.07 |
| 4,899,301 | 2/1990 | Nishitani et al. | 364/726.02 |
| 4,970,674 | 11/1990 | White | 364/726.02 |
| 4,996,661 | 2/1991 | Cox et al. | 364/748.14 |
| 5,038,311 | 8/1991 | Monastra et al. | 364/726.04 |
| 5,093,801 | 3/1992 | White et al. | 364/726.02 |
| 5,243,699 | 9/1993 | Nickolls et al. | 395/800.11 |
| 5,261,056 | 11/1993 | Lyke | 395/200.77 |
| 5,303,172 | 4/1994 | Magar et al. | 364/726.04 |
| 5,307,463 | 4/1994 | Hyatt et al. | 395/821 |
| 5,313,413 | 5/1994 | Bhatia et al. | 364/726.06 |

OTHER PUBLICATIONS

Digital Signal Processing—Chip Set; Honeywell Inc. Signal Processing Technologies, Rev A Mar. 1988, pp. 2–3, 14–16.
A 500 MOPS DSP chip set; G. Luikuo et al., Electronic Engineering Supplement, Jun. 1988 pp. 109–111, 113.
An application–specific FFT processor; S. Gomez et al., Electronic Engineering Supplement, Jun. 1988, pp. 99–100, 104–106.
FFT–based filter design boosts radar system's prowess; R. Cox, Electronic Design, Mar. 31, 1988, pp. 81–84.
Building–block chips are busy widening DSP horizons; M. Leonard, Electronic Design, Mar. 31, 1988, pp. 68–72, 74, 76–77.
An Ultra–High Speed DSP Chip Set For Real–Time Applications; M. Fleming, International Conference on DSP Applications and Technology—Berlin, Oct. 1991, pp. 1A–108—1A–120.
R. Bhatia et al., *A Quasi Radix–16 FFT VLSI Processor*, Proceedings of the ICASSP 91—1991 International Conference on Acoustics, Speech, and Signal Processing, Toronto, Canada, May 14–17, 1991, pp. 1085–1088.

*Primary Examiner*—William M. Treat
*Assistant Examiner*—Kenneth R. Coulter
*Attorney, Agent, or Firm*—Fliesler, Dubb, Meyer & Lovejoy

[57] ABSTRACT

A digital signal processor on an integrated circuit uses a multi-port data flow structure characterized by four ports, referred to as an acquisition port, two data ports, and a coefficient port. All four ports may be bidirectional so that data may be read from and written to the respective ports by the DSP system. This architecture allows a data flow management scheme in which data enters the processor through the acquisition port, or any one of the data ports. As the data is processed, it may ping pong between the data ports, or between a data port and the acquisition port. At the end of a DSP algorithm, the output data may be provided through the acquisition port or a data port as suits the needs of the particular application. A coefficient port is typically used for providing coefficients or twiddle factors for DSP algorithms. A DSP system is provided which includes a digital signal processor having four ports as discussed above. Each data port is attached to dedicated, independent data memory. This provides for optimization of multipass algorithms.

29 Claims, 19 Drawing Sheets

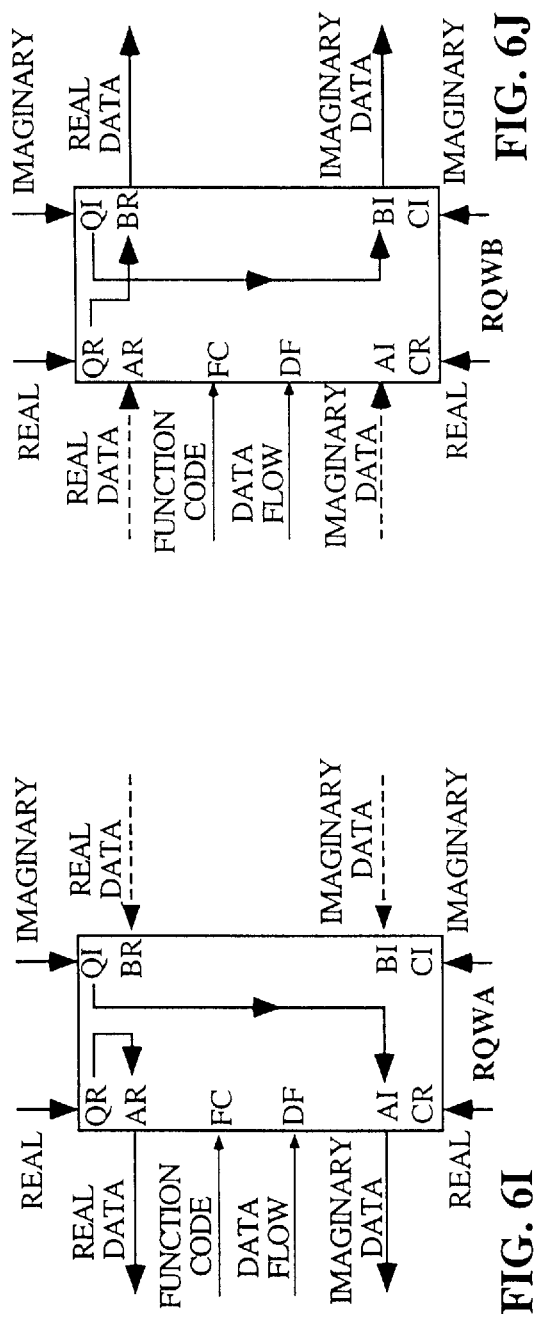

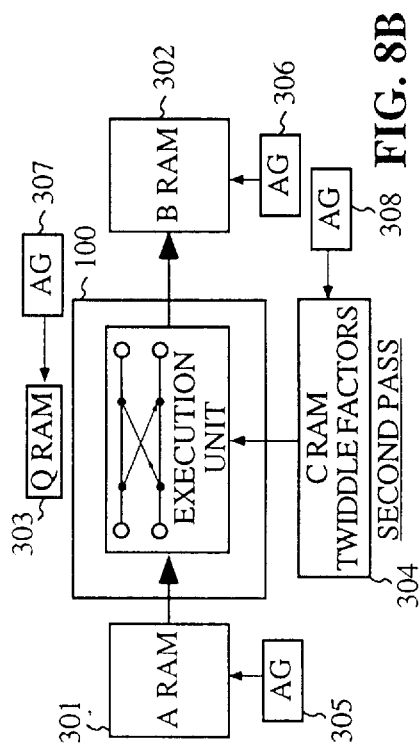
FIG. 8B
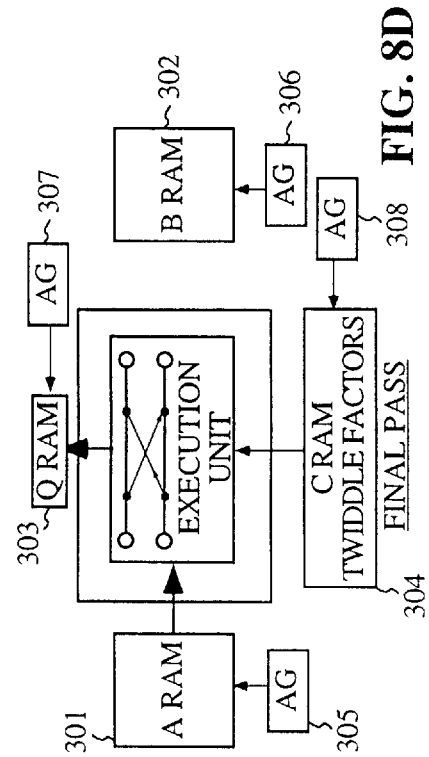
FIG. 8D
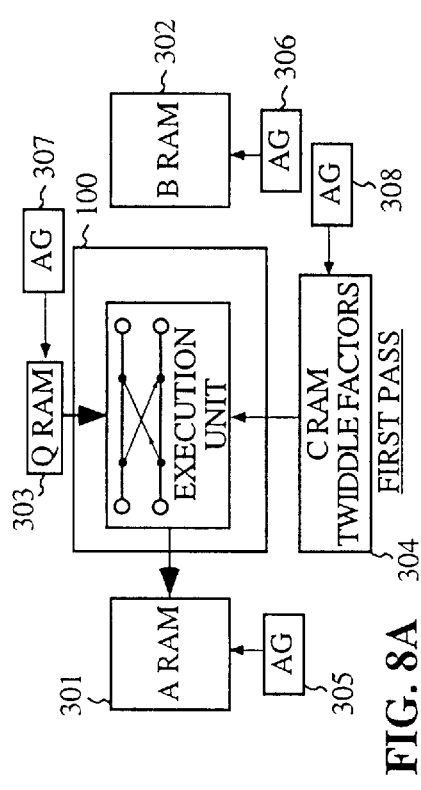
FIG. 8A
FIG. 8C

MULTI-PORT DIGITAL SIGNAL PROCESSOR

BACKGROUND OF THE INVENTION

1. Field of the Invention

The present invention relates to array processors characterized by operations on arrays or blocks of data. More particularly, the present invention relates to digital signal processors implemented on integrated circuits.

CROSS REFERENCE TO RELATED APPLICATION

The present application is related to co-pending U.S. patent application Ser. No. 07/687,289, of Bhatia, et al., filed Apr. 18, 1991, and entitled QUASIRADIX-16 PROCESSOR AND METHOD, The Bhatia, et al., application was commonly owned at the time of invention by the assignee of the present application and its disclosure is incorporated herein by reference.

2. Description of Related Art

Digital signal processors (DSPs) typically do array or block oriented calculations. The arrays or blocks of data typically correspond to a multiword, digitized sample of an analog signal. So, for instance, a single function is repeated n times for a sample which consists of a block of n words of data.

A very common array process is the discrete Fourier transform DFT, or its fast Fourier transform FFT implementation. A given DFT or FFT may require a number of passes of an array of data through the digital signal processing engine, in which the array is modified in a first pass, then the modified array is operated on in a second pass, and so on, until completion of the algorithm. Thus, a given DSP algorithm may involve retrieving a block of data, then passing the block of data through the DSP engine multiple times, and finally providing a resultant block of data as output.

Managing the flow of these arrays of data in multipass algorithms is becoming an increasingly complex problem. Particularly as the bus width, or number of bits per word, increases, the bus control logic, multiplexers, and buffers necessary to implement these data flow paths is beginning to take up significant space and chip count on a board level implementation of the DSP. Also, because these multipass algorithms may require any number of passes, depending on the particular algorithm implemented, the board level designer is faced with providing complex data flow control logic to accommodate wide buses in a wide variety of data flow patterns.

FIG. 1A is a schematic diagram representative of prior art DSP implementations. As can be seen in FIG. 1A DSP 10 for a given FFT type algorithm, includes three ports, a first input port for complex data, an input port for complex coefficients, and an output port to supply output complex data. The data for DSP applications is typically complex, divided into real and imaginary components. In the embodiment shown in FIG. 1A the DSP has two bidirectional ports, port 11 and port 12. A unidirectional coefficient port 13 is included to provide the input for coefficients.

An input path for a real component of a word proceeds from an analog to digital converter 14 through one of two buffers 15, 16 either to a memory structure supporting port 11 or a memory structure supporting port 12. The memory structure supporting port 11 includes four buffers 17, 18, 19, and 20, and two RAMs 21, 22. Similarly, the memory structure supporting port 12 includes four buffers 23, 24, 25, 26, and two RAMs 27, 28. The output path for the real data proceeds from the respective memory structures supporting ports 11 and 12 through respective buffers 29, 30 and a D/A converter 31.

The imaginary data is provided through a similar structure. The input path includes A/D converter 32, a first buffer 33, which provides a path to a memory structure supporting port 11, and a second buffer 34 providing a path to the memory structure supporting port 12. The memory structure supporting port 11 includes four buffers 35, 36, 37, and 38, and two RAMs 39, 40. Similarly, the memory structure supporting port 12 includes four buffers 41, 42, 43, and 44, and two RAMs 45, 46. The output path for the imaginary data proceeds from the respective memory structures of ports 11 and 12 through buffers 45 and 46, respectively, to a D/A converter 47.

The coefficient port 13 is served through real and imaginary RAMs 48, 49. Although not shown, a dedicated input path to the coefficient RAMs is necessary in this prior art implementation.

All this structure is necessary to support the data flow paths which may be encountered in a DSP algorithm.

FIGS. 1B, 1C, 1D, 1E, 1F, and 1G illustrate a variety of data flow paths which might be encountered in the prior art general purpose DSP system of FIG. 1A. In these figures, the data flow paths are illustrated in bold lines. The structures are given the same reference numbers as in FIGS. 1A. In FIG. 1B, data is being loaded and unloaded using the outside RAMs 21, 39, 28, 46, while data is ping ponging through the DSP chip using the inside RAMs 22, 40, 27, 45. Coefficients are being supplied into the DSP chip from the coefficient RAMs 48, 49. In FIG. 1B, the data moves from the memory structure on port 11 into the memory structure on port 12.

In FIG. 1C, the outside RAMs are used for loading and unloading, while the data moves in the ping pong process from the data structure in the inside RAMs on port 12 to the inside RAMs on port 11.

FIGS. 1D and 1E illustrate the loading and unloading on the inside RAMs, and ping ponging on the outside RAMs, going from port 11 to port 12, and from port 12 to port 11, respectively.

The cases handled by the data flow paths in FIGS. 1B–1E work so long as the number of passes through the DSP chip is odd. If you have a process which requires an even number of passes, then the data flow may take the configuration shown in FIGS. 1F and 1G which load and unload in an opposite-sides configuration. Thus, the input data flows from the A/D converter 14, 32 into the outside RAMs 28, 46 on port 12. The output data flows from the outside RAMs 21, 39 in the memory structure on the side of port 11 to the D/A converters 31, 47. As can be seen, data is ping ponging using the inside RAMs going from port 11 to port 12 in FIG. 1F, and going back from port 12 to port 11 in FIG. 1G.

As can be seen, this results in a structure that includes 24 buffers, each the width of the bus being served. In addition, it requires ten RAM arrays of sufficient size to serve the blocks being processed.

Not shown in the diagram in FIG. 1A are the complicated control logic and address generators necessary to manage the operation of all the buffers and RAMs. As can be seen, the chip count of a board implementing the DSP as shown in FIG. 1A is quite high and takes up a large amount of space. Also, because of the large amount of buffers in the data paths, the speed of the DSP is limited significantly.

Accordingly, it is desirable to provide a DSP integrated circuit architecture which minimizes the need for off chip data flow management which has characterized the prior art systems.

SUMMARY OF THE INVENTION

The DSP according to the present invention uses a multi-port data flow structure that alleviates the external multiplexing of data buses, thereby increasing throughput and minimizing system component count. The architecture is characterized by four ports, referred to as an acquisition port, two data ports, and a coefficient port. According to one aspect of the invention, all four ports are bidirectional so that data may be read from and written to the respective ports by the DSP system.

This architecture allows a data flow management scheme in which data enters the processor through the acquisition port, or any one of the data ports. As the data is processed, it may ping pong between the data ports, or between a data port and the acquisition port. At the end of a DSP algorithm, the output data may be provided through the acquisition port or a data port as suits the needs of the particular application.

A coefficient port is typically used for providing coefficients or twiddle factors for DSP algorithms. The coefficient port may be read and/or written through the DSP processor from the acquisition port.

This unique four port architecture eliminates the need for external buffers and data flow control logic on the DSP board. The reduction in chip count achieved is dramatic.

According to another aspect of the present invention, a DSP system is provided which includes a digital signal processor having four ports as discussed above. Each data port is attached to dedicated, independent data memory. This provides for optimization of multipass algorithms unavailable in the prior art. In the first pass of a multipass algorithm, data may be transferred in through the acquisition port, and passed to one of the two data ports. On successive passes, the data is processed in a ping pong fashion between the data ports. On a final pass of the algorithm, data is directed out through the acquisition port. In this configuration, the DSP system is optimized and system performance is limited only by the speed of the memory devices without delays introduced by the buffers or other data flow logic external to the chip.

The coefficient port is bidirectional and may be written through the DSP processor, eliminating the need for dedicated input path to the coefficient RAM. This allows dynamic update of the coefficient memory based on incoming data which is useful for adaptive filtering and the like. Also, it results in a further simplified system level implementation.

Accordingly, the present invention provides an improved DSP architecture, which provides for the implementation of a DSP system having a greatly reduced chip count, and increased speed.

Other aspects and advantages of the present invention can be seen upon review of the figures, the detailed description, and the claims which follow.

BRIEF DESCRIPTION OF THE FIGURES

FIGS. 6A, 6B, 6C, 6D, 6E, 6F, 6G, 6H, 6I, 6J, and 6K illustrate the data flow options implemented in a preferred embodiment of the digital signal processor of FIG. 3.

FIGS. 8A, 8B, 8C, and 8D illustrate the data transfer paths in one representative DSP algorithm utilizing the four port structure of FIG. 7.

DESCRIPTION OF THE PREFERRED EMBODIMENTS

A detailed description of preferred embodiments of the present invention is described with reference to FIGS. 1A, 1B, 1C, 1D, 1E, 1F, 1G, 2, 3, 4, 5, 6A, 6B, 6C, 6D, 6E, 6F, 6G, 6H, 6I, 6J, 6K, 7, 8A, 8B, 8C, 8D, 9, and 10.

FIGS. 2, 3, 4, and 5 illustrate an implementation of a preferred embodiment of an integrated circuit digital signal processor according to the present invention. FIGS. 6A, 6B, 6C, 6D, 6E, 6F, 6G, 6H, 6I, 6J, and 6K illustrate the data flow options available in the preferred embodiment of the digital signal processor according to the present invention. FIGS. 7, 8A, 8B, 8C, 8D, 9, and 10 are provide to illustrate configurations of digital signal processing systems based on the four port integrated circuit DSP of FIG. 2.

I. Integrated Circuit Implementation

Figure 2:
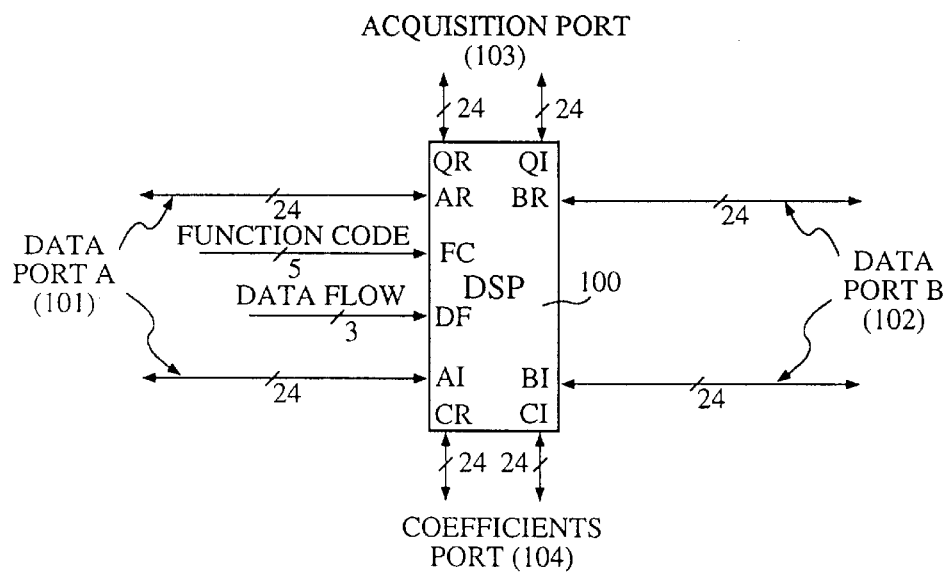
FIG. 2 illustrates the I/O functions of the digital signal processor according to the present invention.

As shown in FIG. 2, an integrated circuit DSP according to the present invention is shown, emphasizing the input/output (I/O) interfaces to the chip. As can be seen, the DSP chip 100 includes four ports. Data port A 101, data port B 102, acquisition port 103, and coefficient port 104. The DSP 100 also includes a function code input FC and a data flow op code input DF. The acquisition port 103 includes a real bidirectional interface QR and an imaginary bidirectional interface QI. Data port A includes a real bidirectional interface AR, and an imaginary bidirectional interface AI. Data port B includes a real bidirectional interface BR and an imaginary bidirectional interface BI. Finally, the coefficient port 104 includes a real bidirectional interface CR and an imaginary bidirectional interface CI. In the implementation shown, each of the ports 101, 102, 103, 104, consists of a 48 bit bus, divided into a 24 bit real part and a 24 bit imaginary part.

The DSP shown in FIG. 2 uses a multi-port data structure that alleviates external multiplexing of data buses, thereby increasing throughput and minimizing system component count. There are four 48-bit bidirectional data ports. Data enters the processor typically through the acquisition port 103 (QR, QI) or a data port 101, 102 (AR, AI, or BR, BI). As the data is processed, it leaves the processor through one of the acquisition 103 or data ports 101, 102. The coefficient port 104 (CR, CI) is typically used for providing the coefficients or twiddle factors, window factors, filter parameters, or other values used in the array process. The data flow pins (DF) provide op codes which control the multiplexing of the data ports to internal data buses. Each data flow code specifies the data ports as inactive, a read or a write port for the duration of a function code. Additionally, the coefficient port 104 may be read and/or written through the DSP 100 from the acquisition port 103, or other ports. This bidirectional coefficient port is useful for adaptive filtering applications, and minimizes the need for dedicated input/output paths apart from the DSP chip for the coefficient RAMs.

Figure 3:
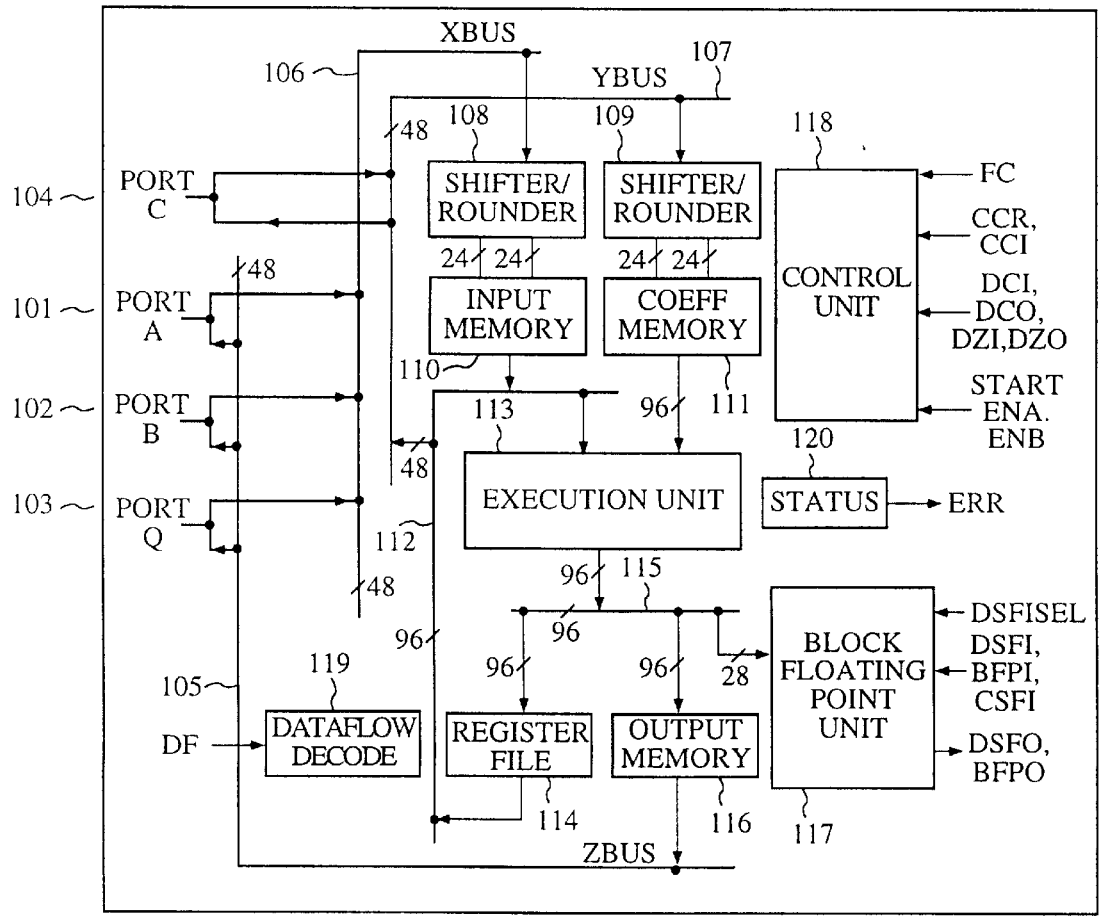
FIG. 3 is a functional block diagram of a DSP implemented according to the present invention.

A functional block diagram of the digital signal processor is provided in FIG. 3. The architecture includes three 48-bit internal buses used for data flow. These include a Z bus 105, an X bus 106, and a Y bus 107. The Z bus 105 is dedicated to provide output data to any of the acquisition port 103, port Q, or the two data ports 101, 102, port A or port B. The X bus 106 is dedicated to provide an input path from any of the Q port, port A or port B. The Y bus 107 provides an input and output path for the coefficient port 104, port C.

In an alternative embodiment, the Y bus 107 is coupled through appropriate logic and drivers to the Z bus 105, or to both the Z bus 107 and X bus 106, to provide more data flow flexibility at the expense of additional chip size or an additional metal layer on the chip. This improved flexibility may be desired for applications needing dynamically changing coefficients.

The X bus 106 and the Y bus 107 are each coupled to respective shifter/rounders 108, 109. The complex outputs of the shifter/rounders 108, 109 are supplied to an input memory 110 or a coefficient memory 111, respectively. The output of the input memory is coupled to an internal bus 112, which is, in turn, coupled to supply data to the Y bus 110, or to the execution unit 113. The internal bus 112 also receives data from a register file 114. The output of the coefficient memory 111 is coupled directly to the execution unit 113. The output of the coefficient memory 111 may also be a suitable junction for coupling the coefficient port to the Z bus 105, in some implementations.

The output of the execution unit is connected to an internal bus 115. This internal bus 115 supplies its data either to a register file 114 or to an output memory 116. Also, a portion of the data on the internal bus 115 is supplied to a block floating point unit 117. The integrated circuit architecture also includes a control unit 118, a data flow decode unit 119, and a status unit 120.

The input shifter/rounders 108, 109 process all incoming data to the DSP chip. The shifter may right shift the incoming data by zero to seven bits. The rounder is used for rounding the shifted data to 24 bits prior to sending it to the execution unit 113. Typically, data needs to be scaled to prevent overflow in execution unit, and in multi-pass transform operations at the beginning of each new pass.

The architecture includes four on-chip memory blocks 110, 111, 114, 116. The input memory 110 is used for temporary storage and sorting of input data. Similarly, the coefficient memory 111 is used for coefficient data. The output memory 116 receives results from the execution unit, sorts it, and sends it to a specified data port. The register file 114 is used for storing intermediate results of specific computations, such as a so-called QR 16 butterfly computation, which is described in detail in our co-pending U.S. patent application entitled APPARATUS AND METHOD FOR PREVENTING I/O BANDWIDTH LIMITATIONS IN FAST FOURIER TRANSFORM PROCESSORS filed Apr. 18, 1991, Ser. No. 07/687,289, now U.S. Pat. No. 5,313,413, invented by Bhatia, et al. The Bhatia, et al., application was commonly owned at the time of invention and is currently commonly owned by the same assignee as the present application. The Bhatia, et al., application is incorporated by reference, as if fully set forth herein for the purpose of additional information concerning the implementation of the execution unit 113 and use of the register file 114.

The execution unit 113, in a preferred system, is optimized to compute decimation-in-time radix-four butterfly operations every two cycles. Its highly parallel and pipeline design comprises three major computational stages. Each stage has multiple computational units to exploit parallelism in DSP algorithms. The data path through the execution unit is controlled by wide microcontrol words generated in the control unit in response to the incoming function codes and data flow op codes.

A first stage in the execution unit 113 is a multiplier array stage. The second stage comprises an adder array stage, and a third stage comprises an array of ALUs.

The block floating point unit 117 employs data dependent scaling. This logic 117 monitors the magnitude of the output data during a pass. At the end of a pass, it presents a scale factor as an output to the chip for use in the next pass of the algorithm to prevent overflow. This logic is based on lookup tables which predict the scale factors from various magnitudes of complex numbers.

The status logic 120 generates error signals based on monitoring of various functions of the chip.

The control unit 118 is used for decoding the function codes into microcontrol words, controlling the start and stop of various operations and other functions necessary to control the operation of the DSP chip as known in the art.

Figure 4:
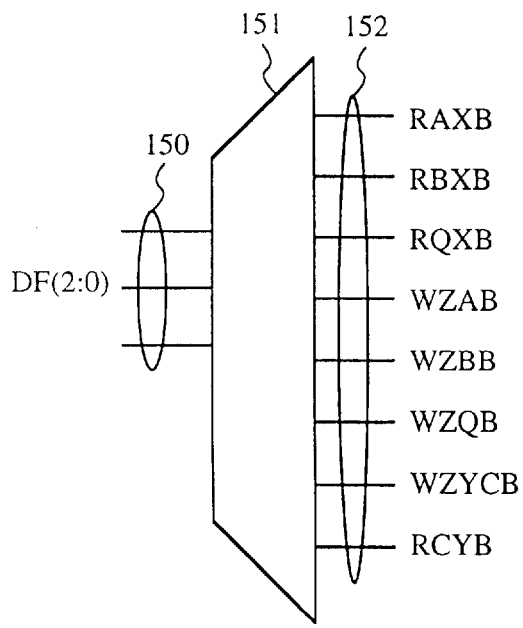
FIG. 4 illustrates the data flow decode logic implementation for the architecture shown in FIG. 3.

The data flow decode unit 119 is illustrated in FIG. 4. In the preferred system, the data flow decode unit receives a 3-bit data flow code DF(2:0) on lines 150 and supplies them through decoding logic 151 to generate eight data flow control signals on lines 152. The control signals include RAXB, which is used to enable transfers from the A port to the X bus, RBXB for transfers from the B port to the X bus, RQXB for transfers from the Q port to the X bus, WZAB for transfers from the Z bus to the A port, WZBB for transfers from the Z bus to the B port, WZQB for transfers from the Z bus to the Q port, WZYCB for transfers of output data available to the Y bus at the output of Register file 114, from the Y bus to the C port, and RCYB for transfers from the C port to the Y bus.

Figure 5:
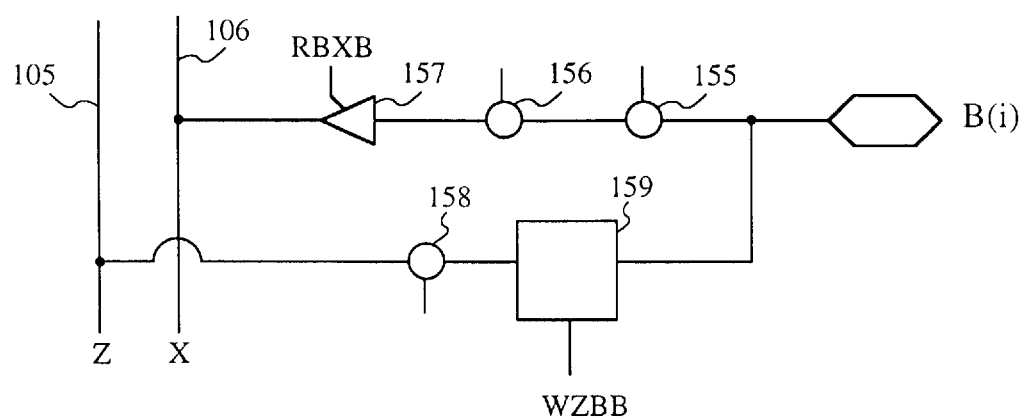
FIG. 5 illustrates a representative port for bit i of port B, and the connection of respective control signals from the data flow decoder of FIG. 4.

FIG. 5 schematically illustrates an interface logic and use of the signals from FIG. 4 for controlling data flow to a pin on a port, such as pin B(i) on port B. B port is coupled to the Z bus 105 and the X bus 106. The path to the X bus from the pin B(i) consists of a first master/slave flip-flop 155, a second master/slave flip-flop 156, and a tri-state buffer 157. The tri-state buffer 157 is enabled by the RBXB signal generated by the decode logic in FIG. 4.

The path from the Z bus to the pin B(i) consists of a first master/slave flip-flop 158 and a tri-state interface driver 159. The interface driver 159 is enabled by the WZBB signal generated in the decode logic of FIG. 4. The difference between the tri-state buffer 157 and the tri-state driver 159 arises from the need of the driver 159 to supply external signals from the chip at TTL levels and at sufficient power to meet necessary design specifications, as known in the art.

In one preferred system, each port A, B, Q, and C is independently clocked, by means of separate clock pins driving the clock signals on the master/slave flip-flops of the respective ports.

FIGS. 6A, 6B, 6C, 6D, 6E, 6F, 6G, 6H, 6I, 6J, and 6K illustrate the data flow options available for the preferred embodiment of the digital signal processor of the present invention. The data flow control signals are supplied in combination with a function code which controls the operation of the DSP on the data being supplied. Many function codes require use of coefficient data in addition to use of input data. Thus, many of the data flow instructions involve input from one of the two data ports, A, B, or the acquisition port Q in combination with inputs from the C port, as well as outputs to one of the two data ports, A, B, or the acquisition port Q.

In the figures, the hatched arrows denote unused data paths while the bold arrows denote data paths active during the instruction. Arrows inside the block representative of the digital signal processor, show heuristically the paths of the respective real and imaginary parts of the data subject of the function code to the identified output port. Note that in one implemented embodiment, there is no read B/write C data flow op code provided, even though it could be done. The data flow op code set is set out below in Table 1.

TABLE 1

Data Flow Opcode Set

Figure 6B:
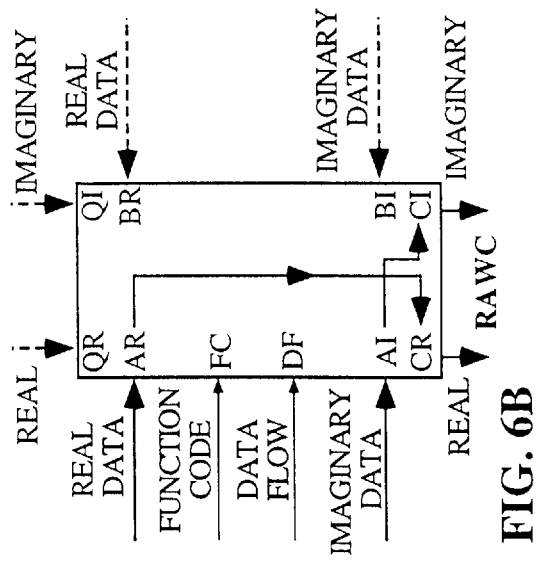
Figure 6A:
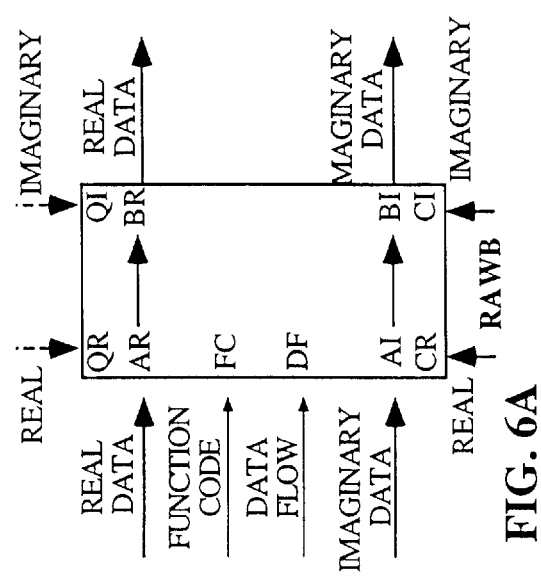
Figure 6D:
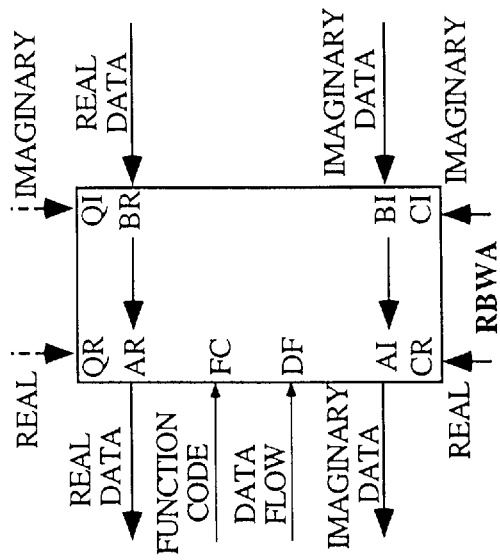
Figure 6C:
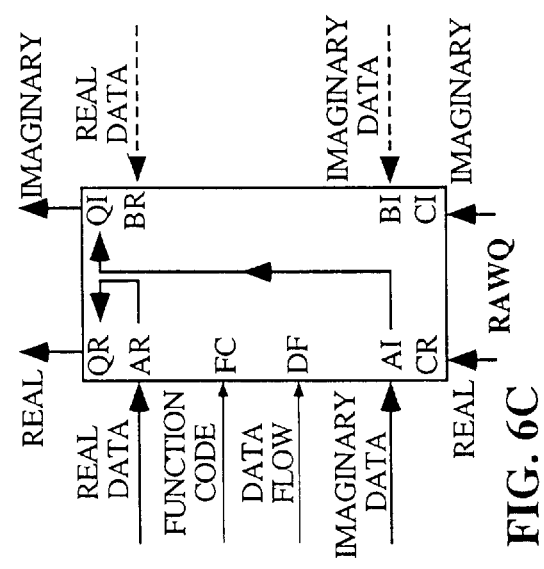
Figure 6F:
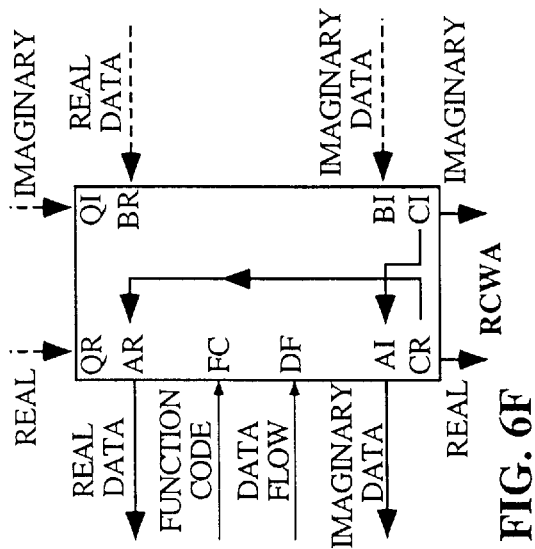
Figure 6E:
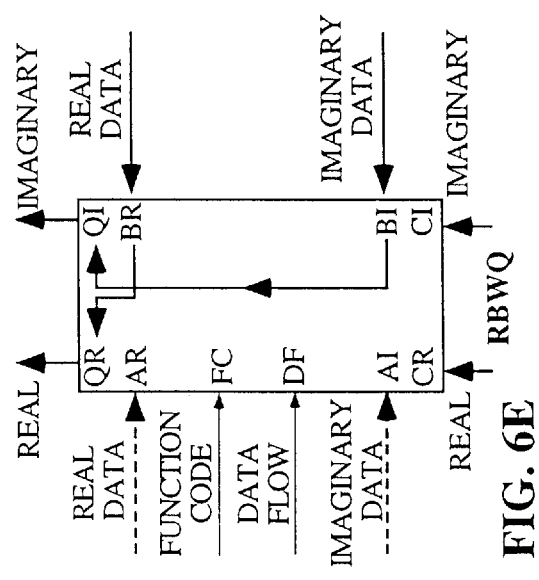
Figure 6H:
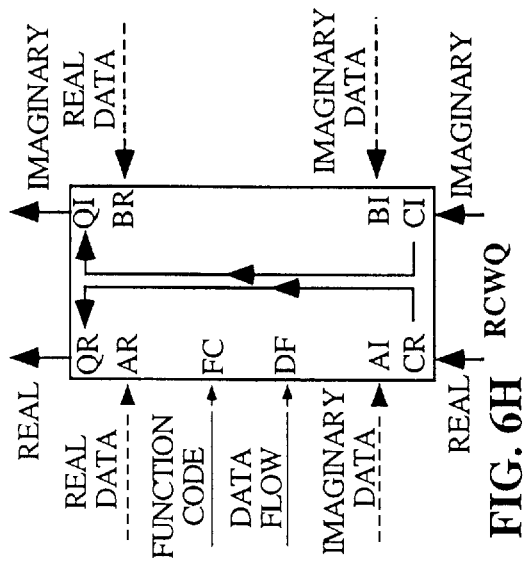
Figure 6G:
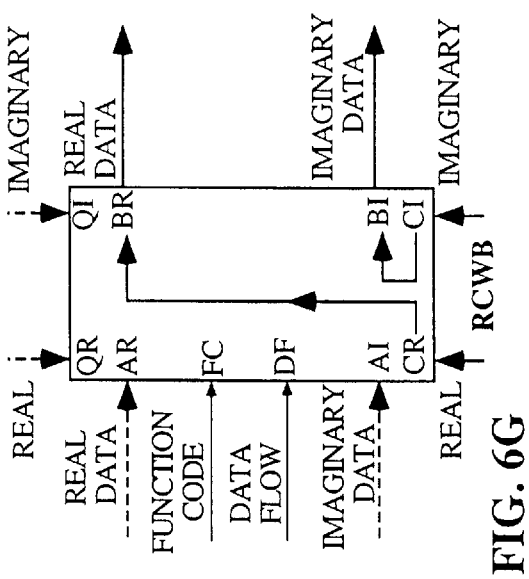
Figure 6K:
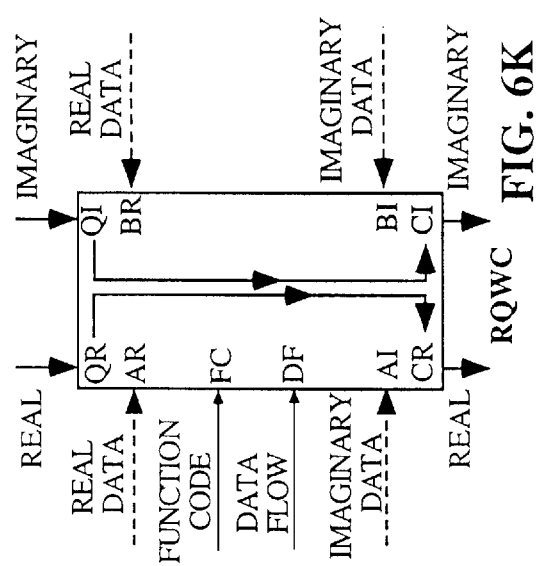

| DF MNEMONIC | DF[2:0] (HEX) | DESCRIPTION | FIGURE |
|---|---|---|---|
| RAWB* | 7 | Read data from port A and write to port B. | FIG. 6A |
| RAWC*** | 6 | Read data from port A and write to port C. | FIG. 6B |
| RAWQ* | 5 | Read data from port A and write to port Q. | FIG. 6C |
| RBWA* | 0 | Read data from port B and write to port A. | FIG. 6D |
| RBWQ* | 4 | Read data from port B and write to port Q. | FIG. 6E |
| RCWA** | 0 or 1 | Read data from port C and write to port A. | FIG. 6F |
| RCWB** | 3 or 7 | Read data from port C and write to port B. | FIG. 6G |
| RCWQ** | 4 or 5 | Read data from port C and write to port Q. | FIG. 6H |
| RQWA* | 1 | Read data from port Q and write to port A. | FIG. 6I |
| RQWB* | 3 | Read data from port Q and write to port B. | FIG. 6J |
| RQWC*** | 2 | Read data from port Q and write to port C. | FIG. 6K |

Because the Y bus 107, which serves the C port, as shown in FIG. 3, is not coupled to the Z bus 105 or the X bus 106 directly, the reads from the C port and writes to the C ports require special function codes. In one preferred system, these function codes are referred to as MOVC and MOVD. Thus, as indicated by **, the RCWA, RCWB, and RCWQ functions are carried out in combination with the MOVC function. The MOVC function uses the execution unit to move data from the C port to the designated A, B, or Q ports. In effect, the data passes from the C port through the execution unit by adding a zero to the value in the adders, and multiplying by 1 in the multipliers. The data passes from the output of the execution unit 113 through the output memory 116 onto the Z bus to the respective port for output.

Reads from the A and Q ports to the C port are accomplished in combination with the MOVD function, as indicated by *** on RAWC and RQWC. The MOVD function operates to move data from the A or Q ports across the XBUS 106, through the shifter/rounder 108 and input memory 110 to internal bus 112. From the internal bus 112, the data is transferred onto the Y bus 107 for supply to the C port. Reads from the B port to the C port may be implemented in this manner, as well. This allows relatively quick transfer of data from one of the data ports A or B or the acquisition port Q into the coefficient memory through the C port.

All of the functions marked with * are available with any function code except MOVC.

Accordingly, as described above, an integrated circuit is provided with on-chip data flow control serving four independent ports. The four independent ports provide significant flexibility to a system designer utilizing the DSP chip according to the present invention.

II. Four Port DSP System Configurations

As mentioned above, the four port integrated circuit DSP chip, according to the present invention, allows a designer of DSP systems significant flexibility in the organization of the data flow and memory used to accomplish a given function. FIGS. 7, 8A, 8B, 8C, 8D, 9, and 10 illustrate several of the unique configurations available according to the present invention.

Figure 7:
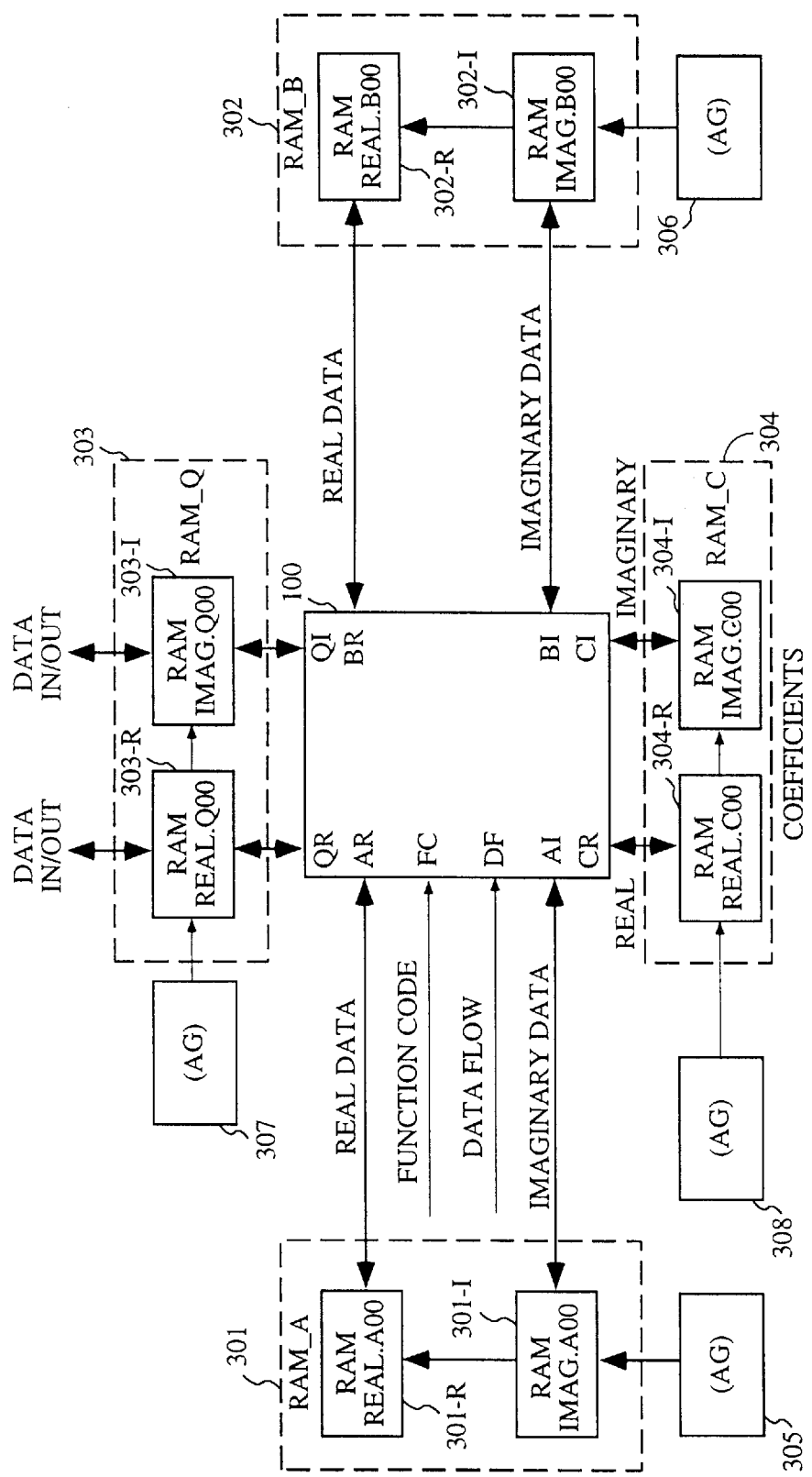
FIG. 7 illustrates a separate data memory configuration of a DSP system using the integrated circuit of FIG. 1A.

FIG. 7 illustrates a basic system configuration taking advantage of the four port DSP chip 100. The DSP chip 100 in the configurations shown in FIGS. 7–10 includes the acquisition port Q, including a real QR and an imaginary QI part, the data port A, including a real AR and an imaginary AI part, the data port B, including a real BR and an imaginary BI part, and a coefficient port C, including a real CR and an imaginary CI part. The inputs to the chip include the function code FC and the data flow code DF, as discussed above. These components are uniformly labelled in each of the figures set out below.

In the configuration shown in FIG. 7, there is an independent RAM memory serving each of the four ports of the chip 100. Thus, there is a memory 301 labelled RAMA serving the A port, including a first RAM 301R and a second RAM 301I for storing real and imaginary components of data on the A port. In addition, there is a memory labelled RAMB 302, including RAM 302R and RAM 302I, serving the real and imaginary parts of the B port. RAMQ 303 includes RAM 303R and RAM 303I serving the real and imaginary parts of the Q port. Finally, RAMC 304 includes RAM 304R and RAM 304I serving the real and imaginary parts of the coefficient port, respectively. Each of the memories 301, 302, 303, and 304, is served by an independent address generator 305, 306, 307, and 308, respectively. The address generators coordinate generation of addresses to the respective memories in combination with generation of the function code and other control signals for the DSP chip to carry out a given array process.

FIGS. 8A, 8B, 8C, and 8D illustrate the advantages of the four port structure, such as shown in FIG. 7, for carrying out a specific array process, such as a 16 point RADIX-2 operation. As can be seen in FIG. 8A, a first pass will involve a data flow function which takes data from the RAMQ 303 and transfers the results of an operation to the RAMA 301. In the first pass, the port to the RAMB 302 is not used, and the port to the RAMC 304 is used for supplying twiddle factors to the RADIX operation being carried out on the data flowing from the RAMQ 303 to the RAMA 301.

In the second pass, as illustrated in FIG. 8B, data from the RAMA 301 is passed through the execution unit of the DSP chip 101 and the results are supplied to the RAMB 302. Again, twiddle factors for the pass are supplied from the RAMC 304. In this pass, the port to the RAMQ 303 is not utilized.

The third pass is illustrated in FIG. 8C. In this pass, the data in the RAMB 302 is passed through the execution unit 100 and the results are stored in the RAMA 301. RAMC 304 is used to supply twiddle factors.

The data may pass back and forth in a ping pong fashion from RAMA 301 to RAMB 302, RAMB 302 to RAMA 301, and so on any number of times. The number of times in which the data ping pongs through the execution unit in this fashion depends on the particular process being executed.

FIG. 8D illustrates the final pass in which data in the RAMA 301 is passed through the execution unit in the DSP chip 100 and results are supplied to the RAMQ 303.

During the execution of the process, during the second and third passes, the RAMQ bandwidth is not burdened by the array processing. Therefore, it can be utilized during this interval to process real time data being generated for processing by the DSP chip in subsequent operations. Thus, the four port structure is ideally suited to real time or near real time digital signal processing applications.

Figure 1A:
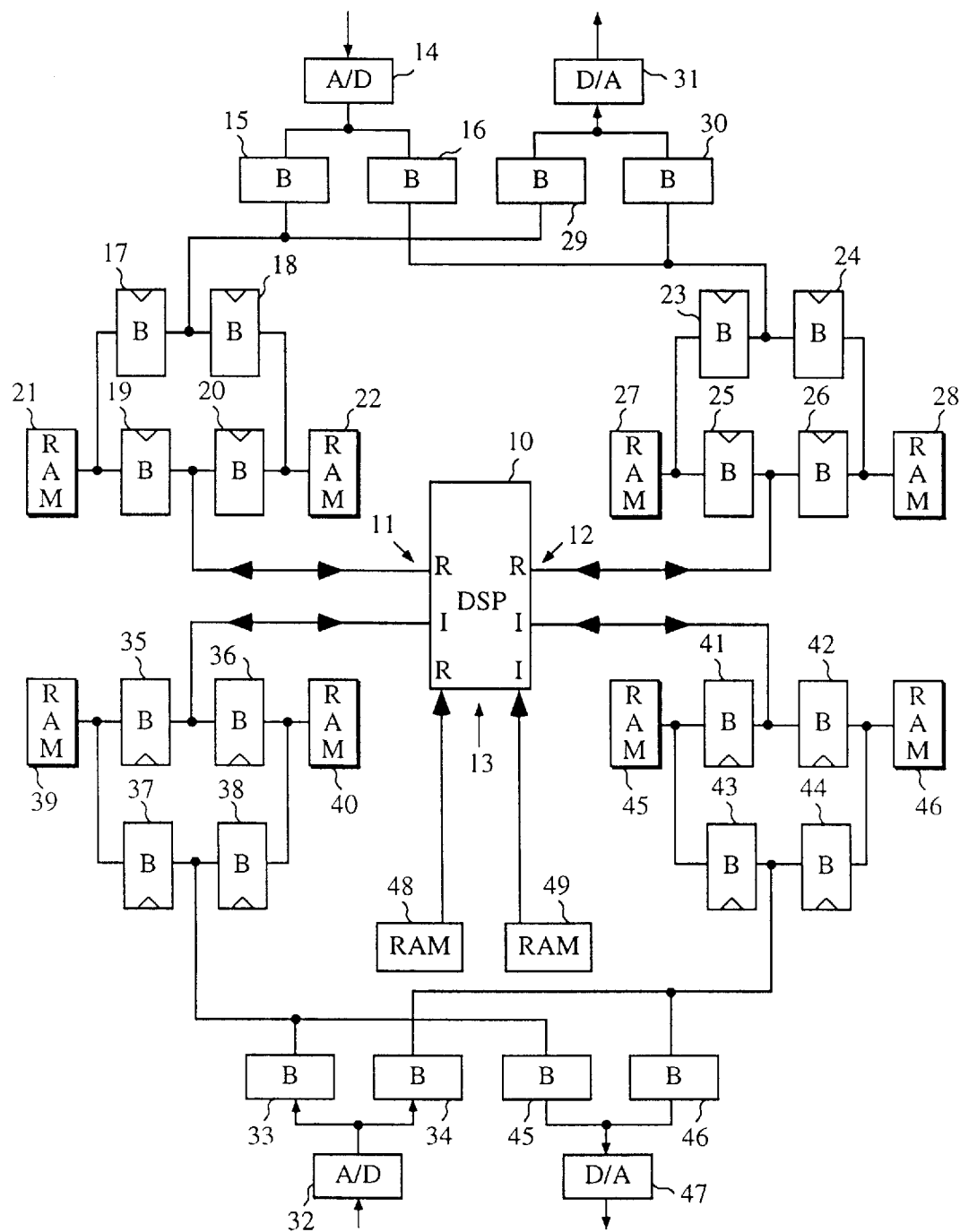
FIG. 1A is a schematic block diagram representative of a prior art DSP system.
Figure 1B:
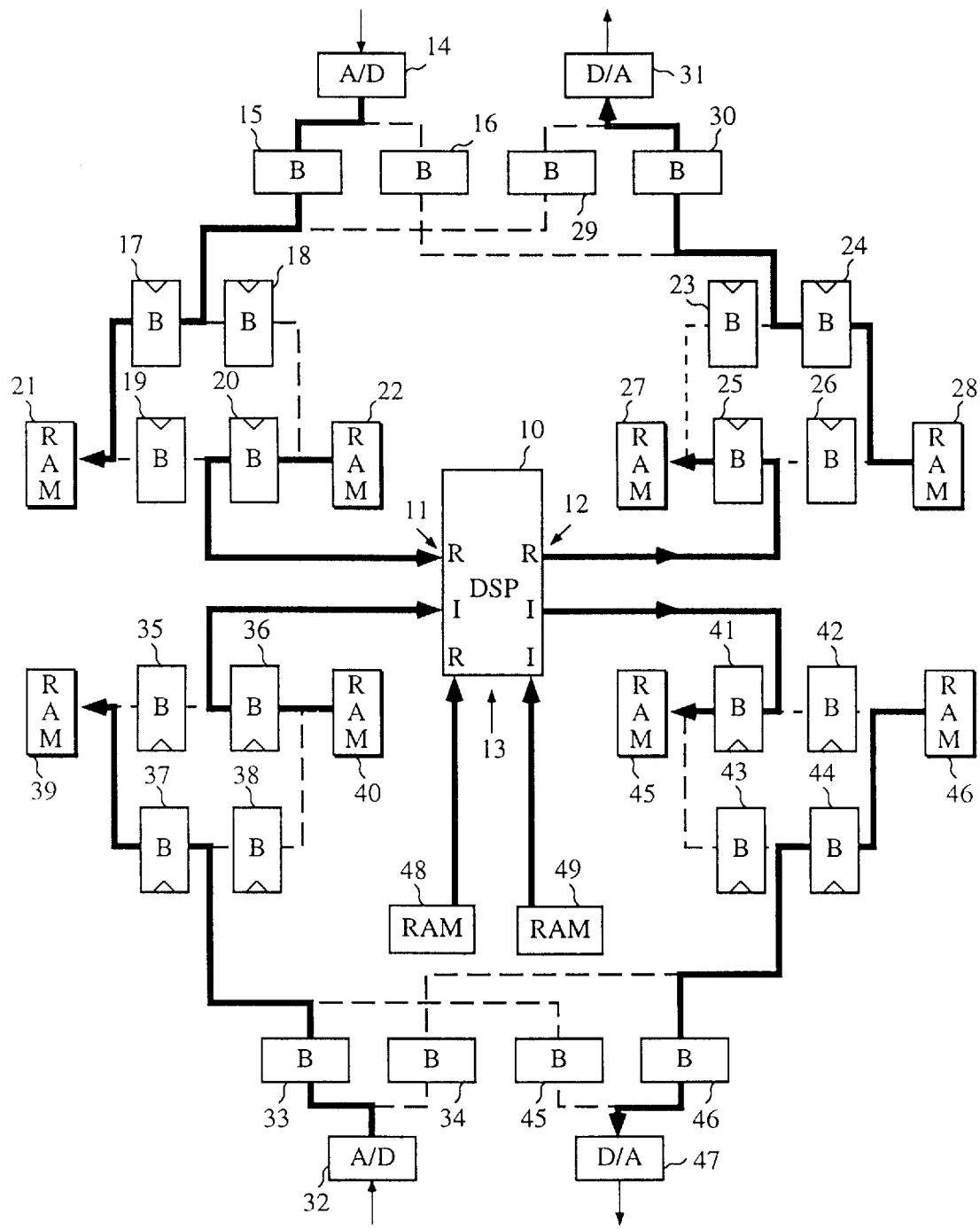
FIGS. 1B, 1C, 1D, 1E, 1F, and 1G illustrate the complexity of data flow paths used in the prior art system of FIG. 1A.
Figure 1C:
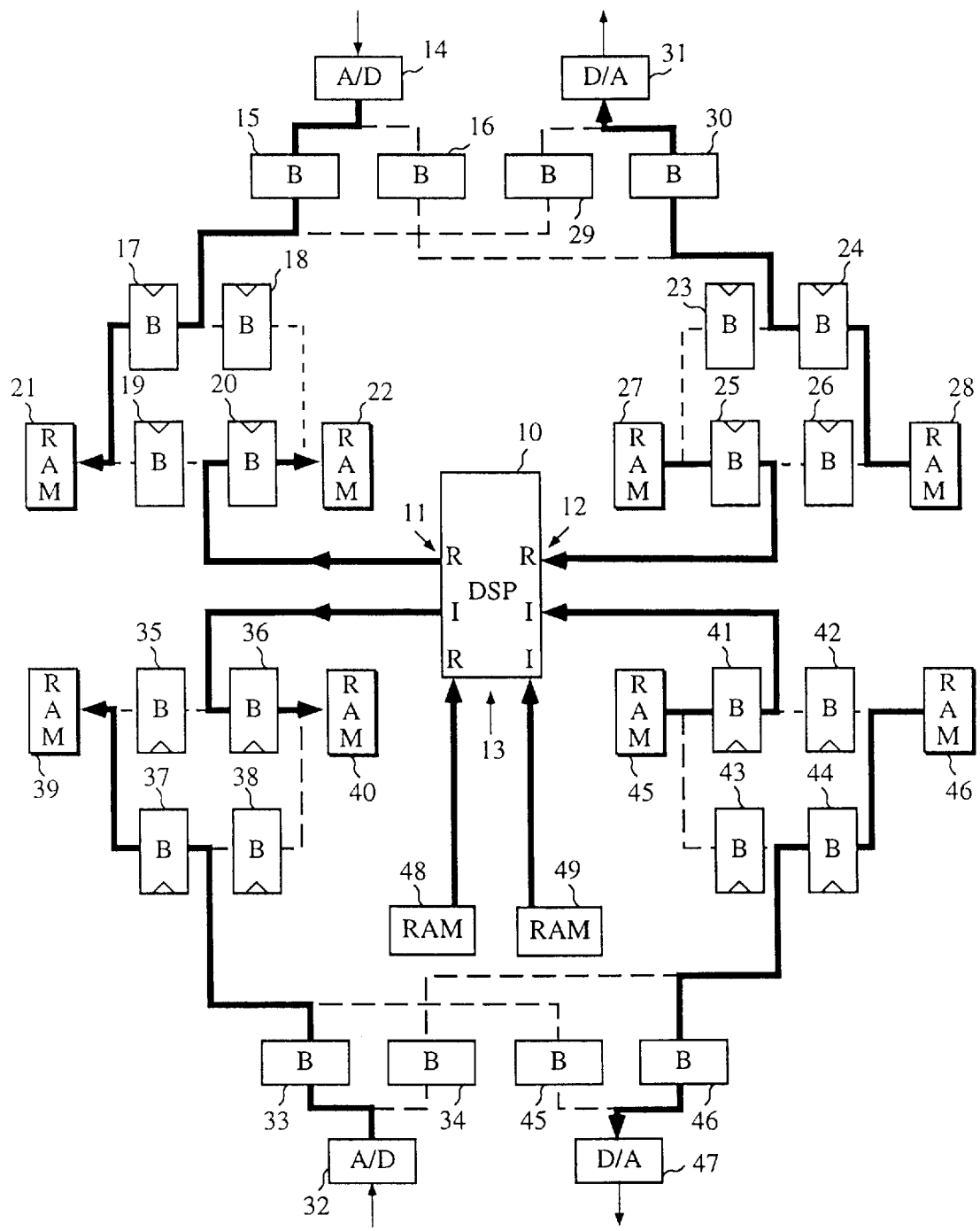
Figure 1D:
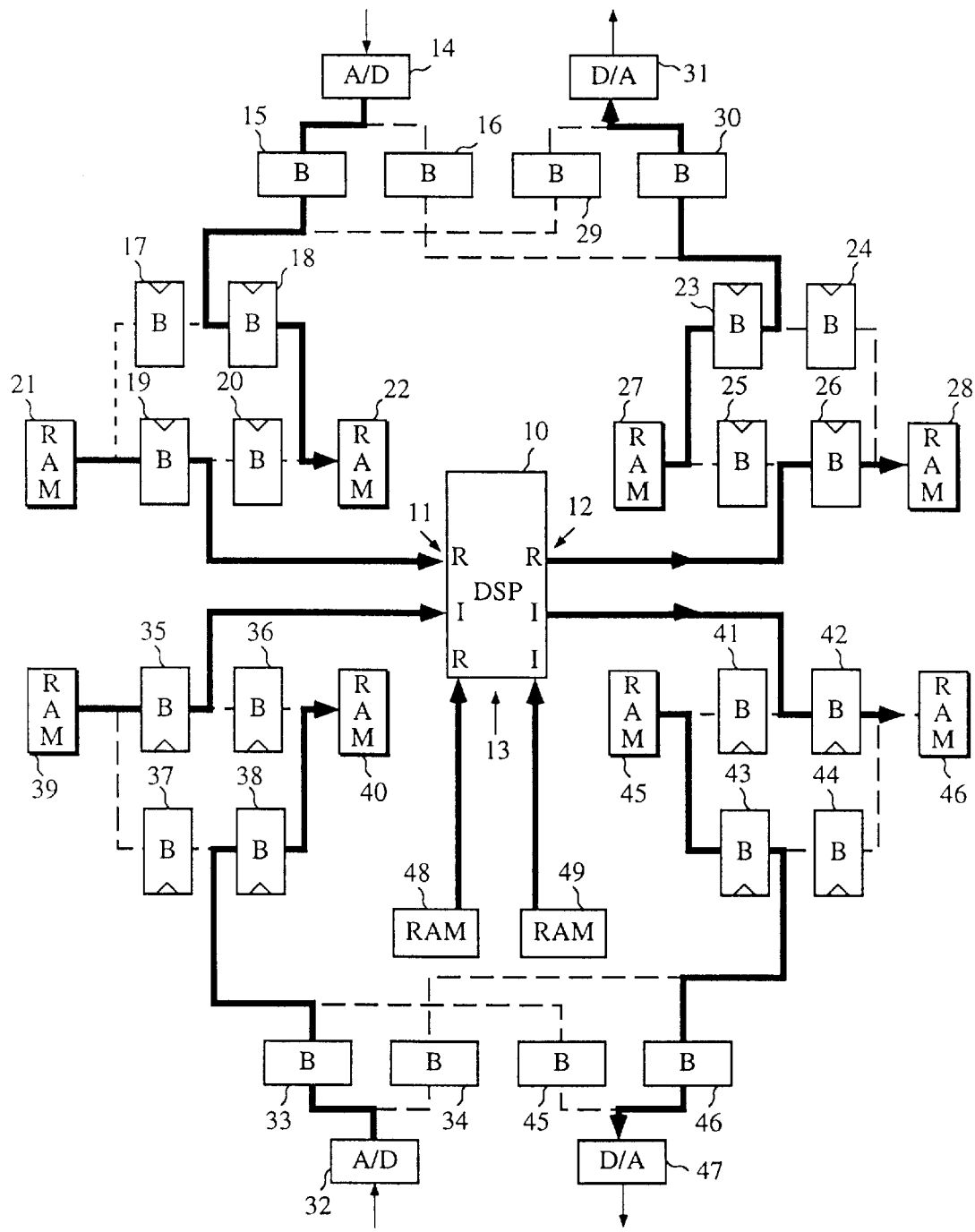
Figure 1E:
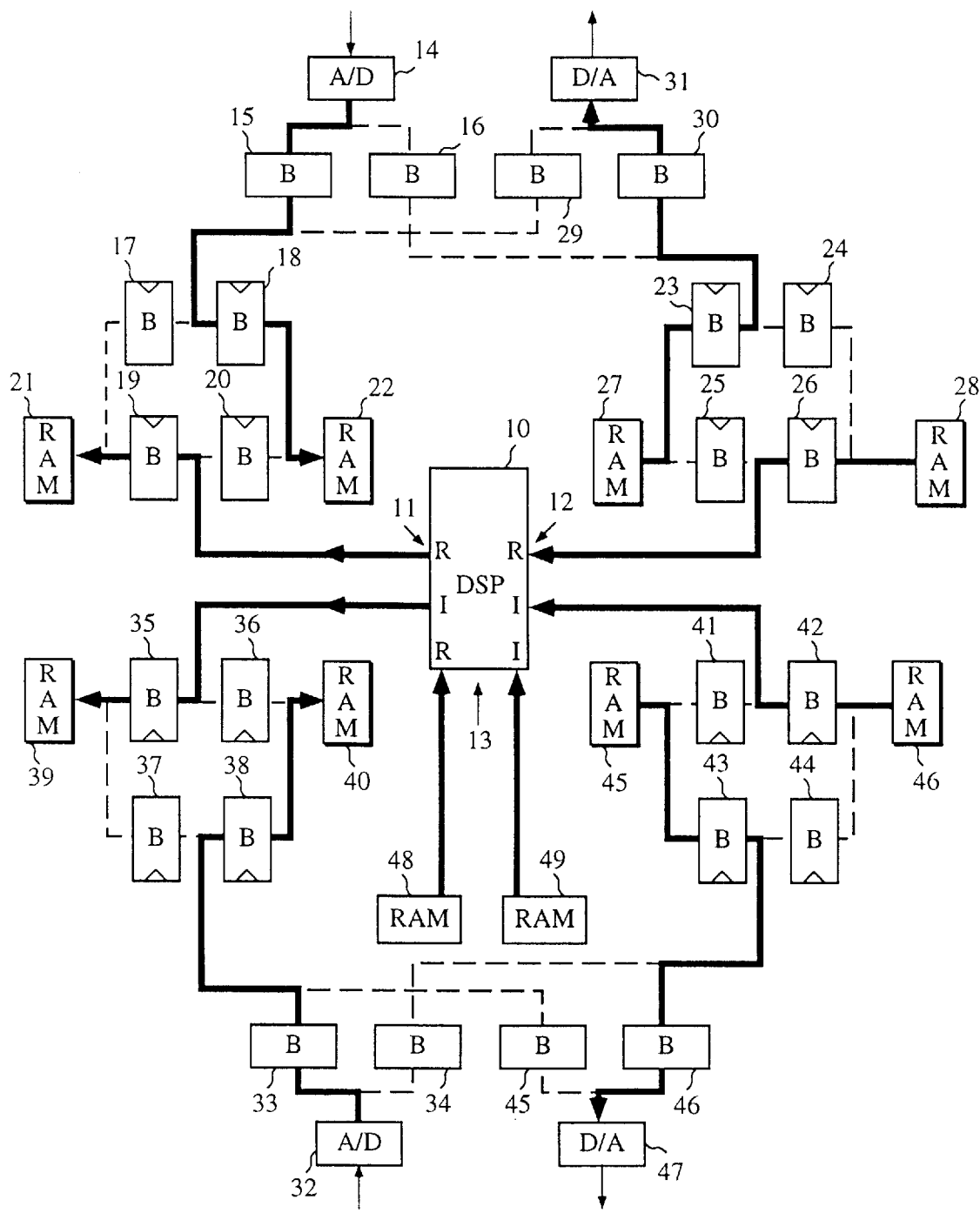
Figure 1F:
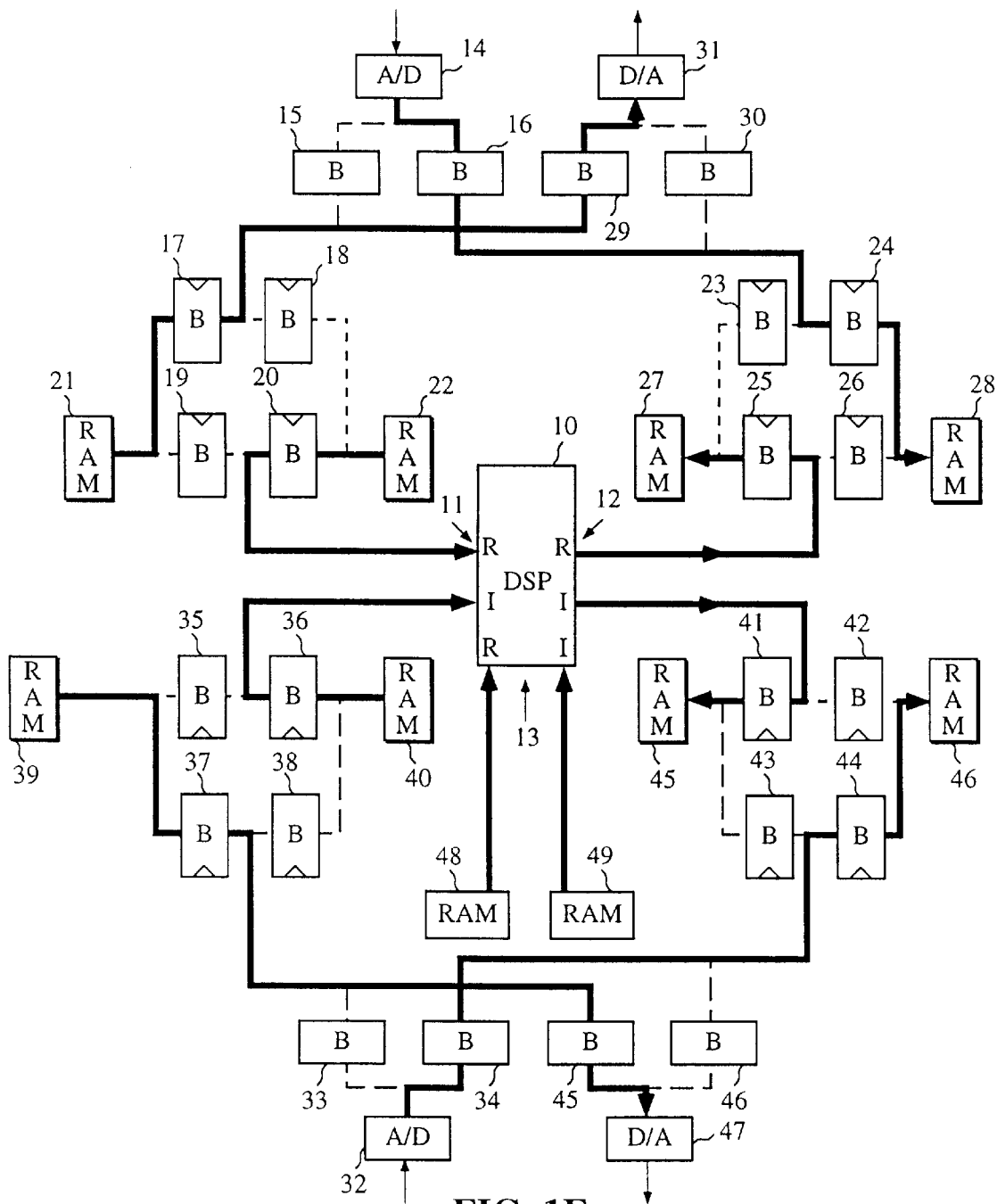
Figure 1G:
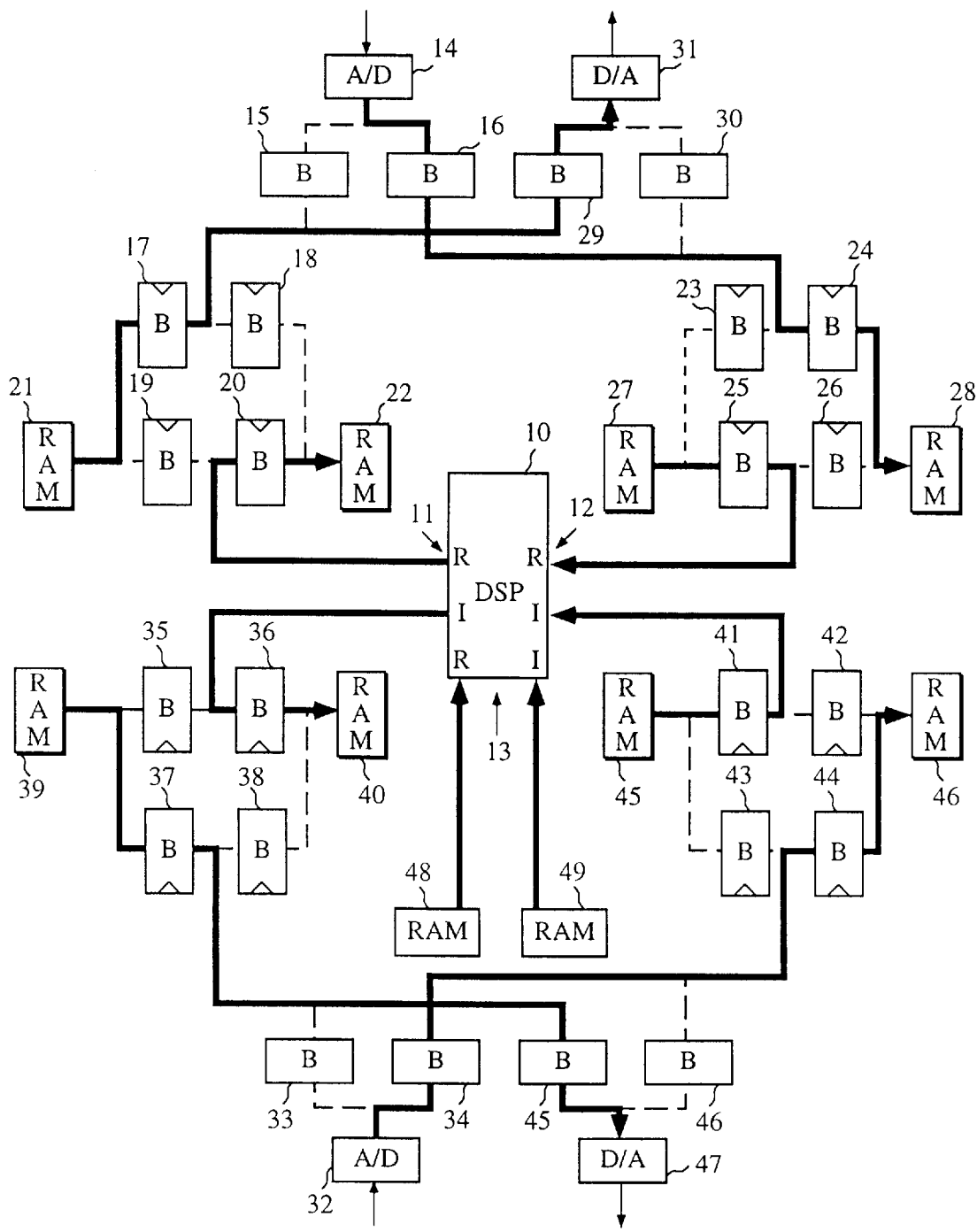
Figure 9:
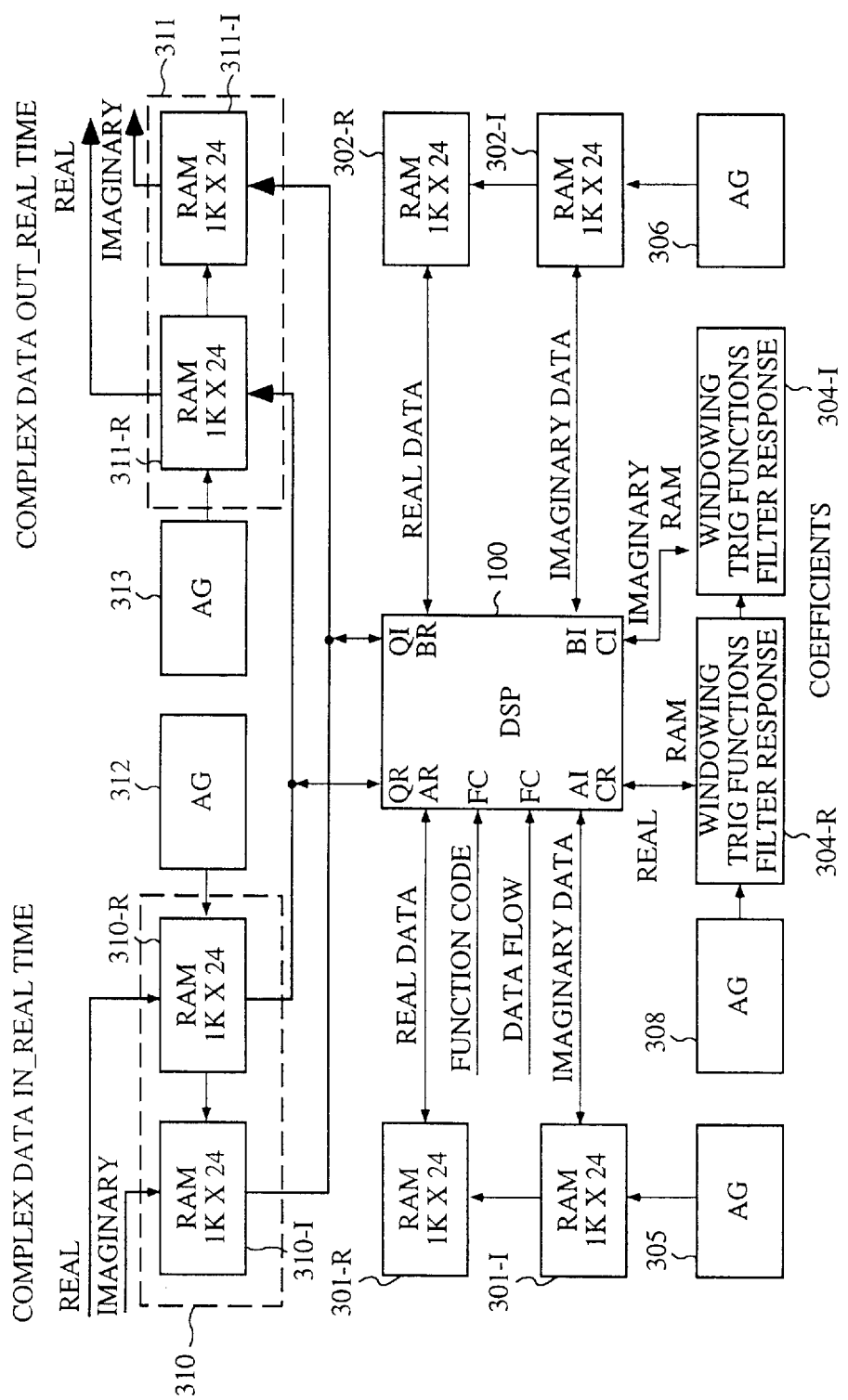
FIG. 9 illustrates a separate acquisition memory configuration for a DSP system utilizing the integrated circuit chip of FIG. 1A.

FIG. 9 illustrates another useful system configuration made possible by the integrated circuit chip of FIG. 1A. The configuration of FIG. 9 is tailored to take advantage of architecture of the DSP chip 100 for real time use. In this system design, a dedicated independent data memory is connected to each port, as in FIG. 7, with the addition of separate input and output memories on the acquisition port.

In the configuration of FIG. 9, the A port, B port, and C port are connected as shown in FIG. 7, and the components are given like reference numbers.

However, the Q port includes an input data memory 310, including RAM 310I storing an imaginary part, and RAM 310R storing a real part of input data for the Q port. The memory structure for the Q port also includes output memory 311 which includes RAM 311I storing the imaginary part and RAM 311R storing the real part of the output data from the Q port. An address generator 312 is coupled to the memory 310 on the input side, and address generator 313 is coupled to memory 311 on the output side. In this implementation, the address generator 312 may be configured to provide for memory efficient data overlap addressing while the address generator 313 may be configured to provide for data discard addressing; or other independent addressing schemes which may suit a particular DSP algorithm may be implemented efficiently. Also, throughput on the Q port is enhanced for real time systems, because the bandwidth of the input memory 310 is not burdened by the output of data from the DSP chip 100 and vice-versa.

Figure 10:
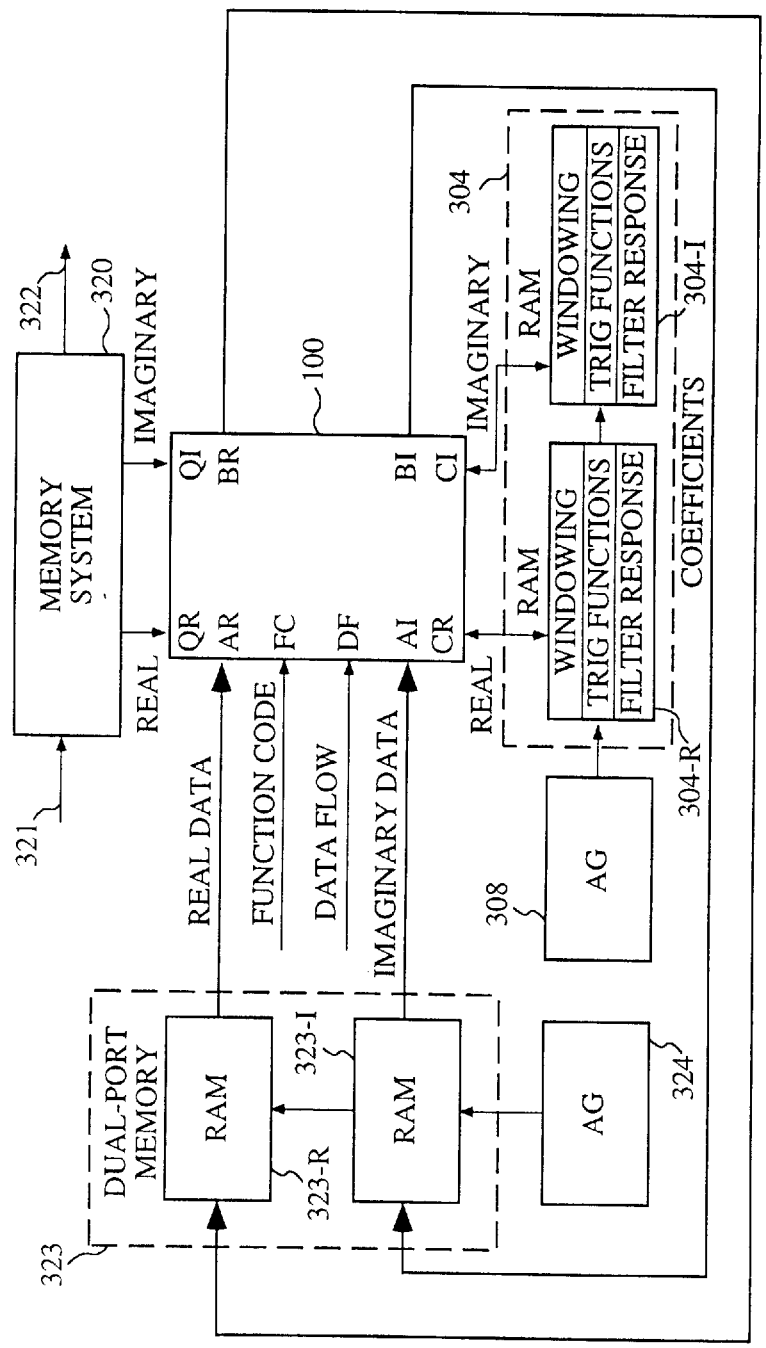
FIG. 10 illustrates a common data memory configuration of a DSP system using the integrated circuit chip of FIG. 1A.

FIG. 10 illustrates yet another alternative system configuration utilizing the four port integrated circuit DSP chip 100 of the present invention. In FIG. 10, the C port is configured as described above with respect to FIG. 7 and the components are given like reference numbers. The Q port may be configured either as shown in FIG. 7, or as shown in FIG. 9 as schematically represented by memory system block 320 having inputs 321 and outputs 322. The A and B ports, on the other hand, are served by dual port memory 323, which includes RAM 323R and RAM 323I serving the real and imaginary parts, respectively, of the A and B ports. The memory 323 is served by an address generator 324 adapted to manage the flow of data in both ports. This allows utilization of the A and B ports to accomplish FFT "in place" algorithms, or other similar algorithms which result in each new array of data generated in a pass through the DSP chip being stored in the same locations as the original array.

A variety of other configurations may be implemented to take advantage of the four port architecture of the DSP chip 100. For instance, a given application may utilize only three of the four ports in order to save system memory at the expense of system throughput.

III. Conclusion

The movement of large amounts of data in a DSP system environment is a very complex and challenging problem. As data buses increase in width and number, so do the number of traces required on a board to either keep the buses private or common. Maintaining integrity of these buses typically requires additional data paths to be created, extra components and extra control logic to occupy already expensive room available on a board. Additional hardware may also require unique timing to gain access to the extra components further complicating the design of a board. Problems of initializing peripheral devices, or gaining access to embedded components may require private buses for data transfers necessary for specific algorithms to be performed. Thus, the present invention provides a unique ability to utilize each port of a novel four port DSP chip as a source as well as a destination, giving the system board designer flexibility not available before. With the implementation of the present invention, no additional components, control logic, data paths, or timing logic is needed to maximize throughput needed for any high performance system design, either in initialization or execution of array or block oriented processes.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An integrated circuit comprising:

first, second, third and fourth complex data ports, each for transferring signals representing complex data having real and imaginary parts;

an instruction port for receiving instructions;

an execution unit for executing digital signal processing functions that input and output complex data;

data routing resources coupled to the first, second, third and fourth complex data ports and further coupled to the execution unit, for routing data between the execution unit and the first, second, third and fourth complex data ports; and data flow control means, coupled to the instruction port and to the data routing resources, for controlling data flow between the execution unit and the first, second, third and fourth complex data ports in response to instructions provided at the instruction port, said data flow control means including execution flow control means for selectively moving data, in continuation with a given pass of said data through the execution unit, from any one of the first, second and third complex data ports through the execution unit to another of the first, second and third complex data ports.

2. The integrated circuit of claim 1, wherein the execution unit has first and second inputs each for receiving complex data and an output for outputting complex data; and wherein the data routing resources include:

a first bus, having real data and imaginary data carrying parts, coupled to the first input of the execution unit;

first data flow means, coupled to the first, second, and third complex data ports and to the first bus and responsive to the data flow control means, for enabling selective transfer of data from a respective one of the first, second and third complex data ports to the first bus;

a second bus, having real data and imaginary data carrying parts, coupled to the output of the execution unit;

second data flow means, coupled to the first, second, and third complex data ports and to the second bus and responsive to the data flow control means, for enabling selective transfer of data from the second bus to a respective one of the first, second and third complex data ports; and third data flow means, coupled to the fourth complex data port and to the second input of the execution unit, for supplying complex data from the fourth complex data port to the second input of the execution unit.

3. The integrated circuit of claim 2, wherein the data flow control means include:

MOVC means, responsive to instructions provided at the instruction port, for causing one or both of the execution unit and the data routing resources to transfer complex data from the fourth complex data port to the second bus.

4. The integrated circuit of claim 3, wherein the MOVC means uses a data transfer path extending through at least a portion of the execution unit to carry out said transfer of complex data from the fourth complex data port to the second bus.

5. The integrated circuit of claim 2, wherein the data routing resources further include:
internal bus interconnect means for coupling the first bus to the third bus; and wherein the data flow control means include:
MOVD means, responsive to instructions provided at the instruction port, for causing the data routing resources to transfer complex data from the first bus to the fourth complex data port by way of the internal bus interconnect means.

6. The integrated circuit of claim 1, wherein the instruction port includes a function code port and a data flow code port, and the data flow control means is responsive to data flow instructions supplied to the data flow code port.

7. The integrated circuit of claim 6, wherein the data flow control means is further responsive to function code instructions supplied at the function code port.

8. The integrated circuit of claim 1, wherein said execution flow control means selectively moves data, in continuation with a given pass of said data through the execution unit, from any one of the first, second and third complex data ports through the execution unit to any other of the first, second and third complex data ports.

9. The integrated circuit of claim 1, wherein each of the first, second and third complex data ports transfers the real and imaginary parts of its correspondingly transferred data in parallel.

10. The integrated circuit of claim 1 wherein said selective moving of data from any one of the first, second and third complex data ports through the execution unit provides a functionally equivalent transform within the execution unit of the data moved therethrough irrespective of which of the first, second and third complex data ports was the source of said data.

11. An integrated circuit comprising:

bidirectional first and second complex data ports each for bidirectionally transferring complex digital data signals representing complex digital data having real and imaginary parts;

a bidirectional third complex data port for bidirectionally transferring further complex digital data signals including data signals representing complex coefficient data, said complex coefficient data having real and imaginary parts;

an instruction port for receiving instructions;

an execution unit, having a complex data input, a complex coefficient input and a complex data output, for executing digital signal processing functions that receive and responsively produce complex digital data signals representing complex data;

data routing resources coupled to the first, second and third complex data ports and to the execution unit, for routing complex digital data signals between the execution unit inputs and output and the first, second and third complex data ports; and data flow control means, coupled to the instruction port and to the data routing resources, for controlling data flow between the execution unit and the first, second and third complex data ports in response to instructions provided at the instruction port.

12. The integrated circuit of claim 11, further including a bidirectional fourth complex data port for bidirectionally transferring additional complex digital data signals representing complex digital data having real and imaginary parts;

wherein the data routing resources are further coupled to the fourth complex data port for routing complex digital data signals between the fourth complex data port and the execution unit and the first, second and third complex data ports; and wherein the data flow control means are further for controlling data flow between the fourth complex data port and the execution unit and the first, second and third complex data ports such that data is selectively movable from any one of the first through fourth complex data ports through at least one of the execution unit and the data routing resources to another of the first through fourth complex data ports.

13. The integrated circuit of claim 11, wherein the data routing resources include:

a first bus, having real data and imaginary data carrying parts, coupled to the first input of the execution unit;

first data flow means, coupled to the first and second complex data ports and to the first bus and responsive to the data flow control means, for enabling selective transfer of data from a respective one of the first and second complex data ports to the first bus;

a second bus, having real data and imaginary data carrying parts, coupled to the output of the execution unit;

second data flow means, coupled to the first and second complex data ports and to the second bus and responsive to the data flow control means, for enabling selective transfer of data from the second bus to a respective one of the first and second complex data ports;

third data flow means, coupled to the bidirectional third complex data port and to the complex coefficient input of the execution unit, for supplying complex data from the bidirectional third complex data port to the coefficient input of the execution unit; and fourth data flow means, responsive to the data flow control means, for transferring complex data from the first bus to the third complex data port.

14. The integrated circuit of claim 13,
wherein the execution unit includes an input memory; and
wherein the fourth data flow means includes a data path extending through at least a portion of the execution unit.

15. The integrated circuit of claim 13, wherein the data routing resources further include:
fifth data flow means, responsive to the data flow control means, for transferring complex data from the third complex data port to the second bus.

16. The integrated circuit of claim 15, wherein the fifth data flow means includes a data path extending through at least a portion of the execution unit.

17. The integrated circuit of claim 11, wherein the instruction port includes a function code port and a data flow code port, and the data flow control means is responsive to data flow instructions supplied to the data flow code port.

18. The integrated circuit of claim 17, wherein the data flow control means is further responsive to function code instructions supplied at the function code port.

19. A digital signal processing system comprising:
(a) a digital signal processor having:
  (a.1) a first complex data port for bidirectionally transferring first complex digital data signals representing complex digital data having real and imaginary parts;
  (a.2) a second complex data port for bidirectionally transferring second complex digital data signals representing complex digital data having real and imaginary parts;
  (a.3) a third complex data port for bidirectionally transferring third complex digital data signals representing complex digital data having real and imaginary parts;
  (a.4) a fourth complex data port for bidirectionally transferring fourth complex digital data signals representing complex digital data having real and imaginary parts, the data represented by said fourth complex digital data signals including coefficient data;
  (a.5) an execution unit, having a data input, a coefficient input and a data output, for executing digital signal processing functions with complex data;
  (a.6) data routing resources coupled to the first, second, third and fourth complex data ports, for routing complex digital data signals between the execution unit and the first, second, third and fourth complex data ports; and
  (a.7) an instruction port for receiving instructions;
  (a.8) data flow control means, coupled to the instruction port and to the data routing resources, for controlling data flow between the execution unit and the first through fourth complex data ports in response to instructions provided at the instruction port;
(b) an acquisition memory system, coupled to the first complex data port and to a source of digital signal data, for acquiring digital signal data from the source and supplying acquired data to the digital signal processor as at least part of said first complex digital data signals;
(c) a working memory system coupled to the second and third complex data ports for storing said second and third complex digital data signals; and
(d) a coefficient memory system coupled to the fourth complex data port for supplying coefficient data to the digital signal processor as at least part of said fourth complex digital data signals.

20. The system of claim 19, wherein the acquisition memory system includes:
(b.1) an input memory for storing and supplying input data to the digital signal processor by way of said first complex data port;
(b.2) an output memory for storing output data received from the digital signal processor by way of said first complex data port; and
(b.3) first and second address generator means for respectively and independently generating addresses for the input and output memories.

21. The system of claim 19, wherein the working memory system includes:
(c.1) first and second independent memories coupled respectively to the second and third complex data ports; and
(c.2) first and second address generator means for independently and respectively generating addresses for the first and second independent memories.

22. The system of claim 19, wherein the working memory system includes:
a dual port memory coupled to the second and third complex data ports.

23. The system of claim 19, wherein the digital signal processor includes means for transferring data from the first complex data port to the coefficient memory system through the fourth complex data port.

24. The system of claim 19, wherein the digital signal processor is integrated on a single integrated circuit chip.

25. A digital signal processing circuit comprising:
(a) an execution unit having a first input for receiving complex input data, a second input for receiving complex coefficient data and an output for outputting complex final or intermediate result data;
(b) an X-bus for carrying the complex input data to the execution unit first input;
(c) a Z-bus for carrying the complex result data of the execution unit;
(d) a bidirectional A-port, for inputting data to the X-bus, and for outputting data from the Z-bus;
(e) a bidirectional B-port, for inputting data to the X-bus, and for outputting data from the Z-bus;
(f) a bidirectional Q-port, for inputting data to the X-bus, and for outputting data from the Z-bus; and
(g) data flow control means for managing data flow between the A, B, Q ports, the X, Z buses and the execution unit such that data is selectively movable from any one of the A, B, Q ports through the execution unit to another of the A, B, Q ports.

26. A digital signal processing circuit according to claim 25 and further comprising:
(h) a Y-bus for carrying the complex coefficient data to the execution unit second input; and
(i) a bidirectional C-port, for inputting and outputting data of the Y-bus.

27. A digital signal processing method comprising the steps of:
(a) providing a digital signal processing system having:
  (a.1) an execution unit having a first input for receiving complex input data, a second input for receiving complex coefficient data and an output for outputting complex final or intermediate result data;
  (a.2) an X-bus for carrying the complex input data to the execution unit first input;

(a.3) a Z-bus for carrying the complex result data of the execution unit;

(a.4) a bidirectional A-port, for inputting data to the X-bus, and for outputting data from the Z-bus;

(a.5) a bidirectional B-port, for inputting data to the X-bus, and for outputting data from the Z-bus;

(a.6) a bidirectional Q-port, for inputting data to the X-bus, and for outputting data from the Z-bus; and (a.7) data flow control means for managing data flow between the A, B, Q ports, the X, Z buses and the execution unit such that data is selectively movable from any one of the A, B, Q ports through the execution unit to another of the A, B, Q ports;

said method further comprising the steps of:

(b) processing first data by moving the first data from the Q-port, through the execution unit, to a first one of the A-port and B-port to thereby produce second data at the first one of the A-port and B-port;

(c) processing the second data by moving the second data from the first one of the A-port and B-port, through the execution unit, to a second one of the A-port and B-port to thereby produce third data at the second one of the A-port and B-port; and (d) processing the third data by moving the third data from the second one of the A-port and B-port, through the execution unit, back to the first one of the A-port and B-port to thereby produce fourth data at the first one of the A-port and B-port.

28. A digital signal processing method according to claim 27 further comprising the step of:

(e) extracting already-processed data by moving the already-processed data from either the A-port or the B-port, to the Q-port.

29. A digital signal processing method according to claim 28 wherein the step of extracting further includes processing the already-processed data in the execution unit while moving the already-processed data from either the A-port or the B-port, to the Q-port to thereby produce further processed data at the Q-port.

* * * * *